UNITED STATES PATENT OFFICE.

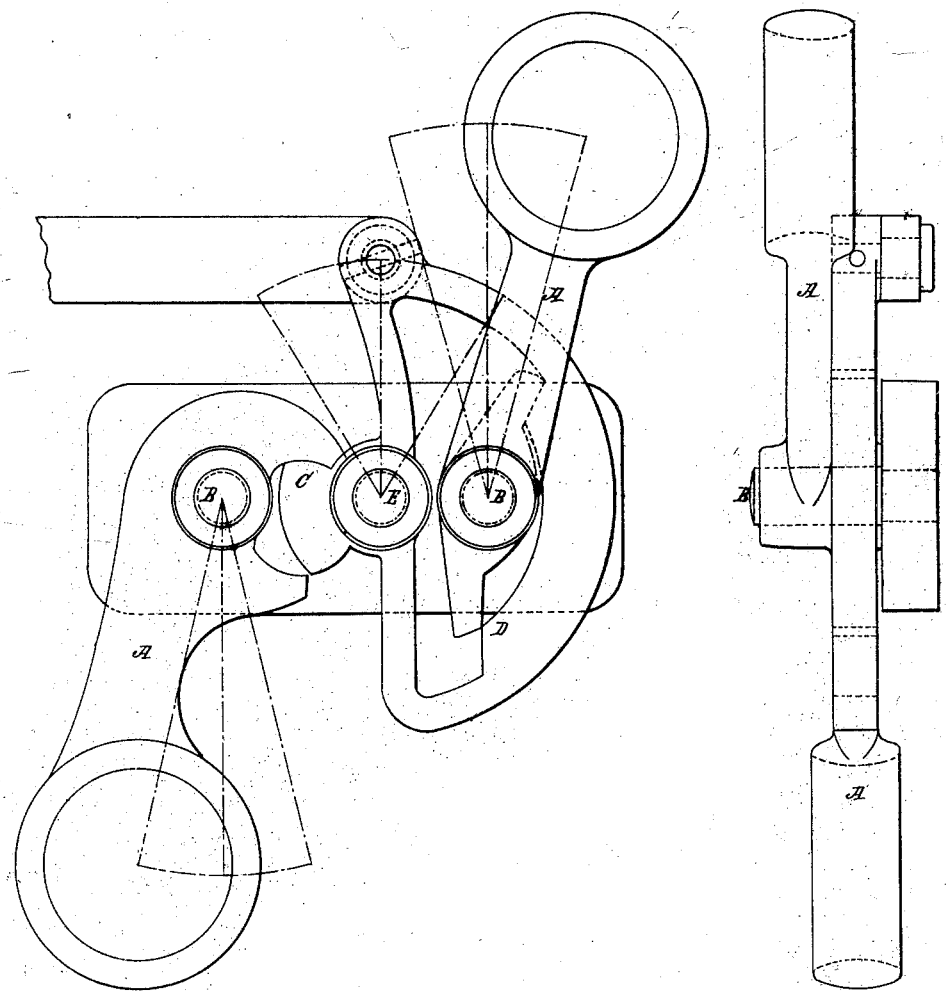

WILLIAM SELLERS, OF PHILADELPHIA, PENNSYLVANIA.

IMPROVEMENT IN BELT-SHIFTING DEVICES.

Specification forming part of Letters Patent No. 37,180, dated December 16, 1862.

*To all whom it may concern:*

Be it known that I, WILLIAM SELLERS, of the city of Philadelphia and State of Pennsylvania, have invented an Improved Device for Shifting Belts; and I do hereby declare the following to be a full and exact description thereof, reference being had to the accompanying drawing, making part of this specification, and to the figures and letters of reference marked thereon.

In nearly all machines requiring a change of motion, or the reversal of the same, by the use of two belts moving at different velocities or in the opposite direction, the required change has been produced by having the shifters connected together in such a manner that the movement of one shall operate the other at the same time, and to prevent both belts from being upon the driving-pulley at the same instant it is usual to move the belt twice its width, three-fourths of the movement being upon a loose pulley and the remainder upon the driving-pulley. This arrangement requires that the loose pulley shall be twice as wide as the belt; and the object of my improvement is to operate the belt-shifters in such a manner that the belt shall only be moved its own width, thereby diminishing the width and weight of the loose pulleys and the wear and tear of the belt by one-half.

The nature of my invention consists in arranging the segments of an internal and external wheel so as to work about a common center, and to have one tooth on each gear into a corresponding space on each belt-shifter, in such a manner that a full movement of the segments in either direction will operate the belt-shifters, but not at the same time, one being arranged to complete its movement before the other commences, and upon reversing the motion of the segments the movement of the shifters will take place as before, but in the reverse order—that is, the shifter which completed its movement last when the segments are moved in one direction will commence and complete its movement first when the segments are moved in the opposite direction.

This will be more fully understood by referring to the drawing, in which A A are the belt-shifters, supported by and movable around the center studs, B B. C is a tooth of an external, and D of an internal, wheel, both being upon one piece, supported by and movable around the stud E, the tooth C gearing with a corresponding space upon one belt-shifter, and the tooth D with the other.

As represented in the drawing, the segments are in the middle of their movement, the tooth C having passed out of gear with its shifter, and if the movement of the segments should be continued in the same direction, no further movement of this shifter could take place. The tooth D will operate its shifter only until it also passes out of gear. If, then, the segments should be moved in the opposite direction, the tooth D, having passed out of gear with its shifter last, will be in a position (the motion being reversed) to go into gear first, and consequently the shifter which completed its movement last will then commence and complete its movement first, and the tooth D will pass out of gear with it as the tooth C goes into gear with its shifter, moving it until this tooth passes out of gear, when no further motion can take place until the motion of the segments is reversed.

The advantages of this arrangement are, that the position of the engaging teeth on the segment-wheel determines the difference in time between the movement of the two shifters. These may be varied so as to allow the belt moving off the driving-pulley to be entirely clear before the other goes on. It is evident, also, that when the segment-teeth C and D have passed out of gear, the belt-shifters A A are locked, so that no movement can take place until the segment-wheel is moved, thus making the position of the shifters perfectly secure. The use of an external and internal wheel causes the driving and driven surfaces, when in action, to move always from each other, making the movement perfectly easy and without strain, which would not be the case if both segments were of the same character.

Having thus fully described my invention, what I claim as new, and desire to secure by Letters Patent, is—

The use of an internal and external segment-wheel, arranged substantially as and for the purpose specified.

WM. SELLERS.

Witnesses:
COLEMAN SELLERS,
THEODORE BERGNER.